Figure 1:
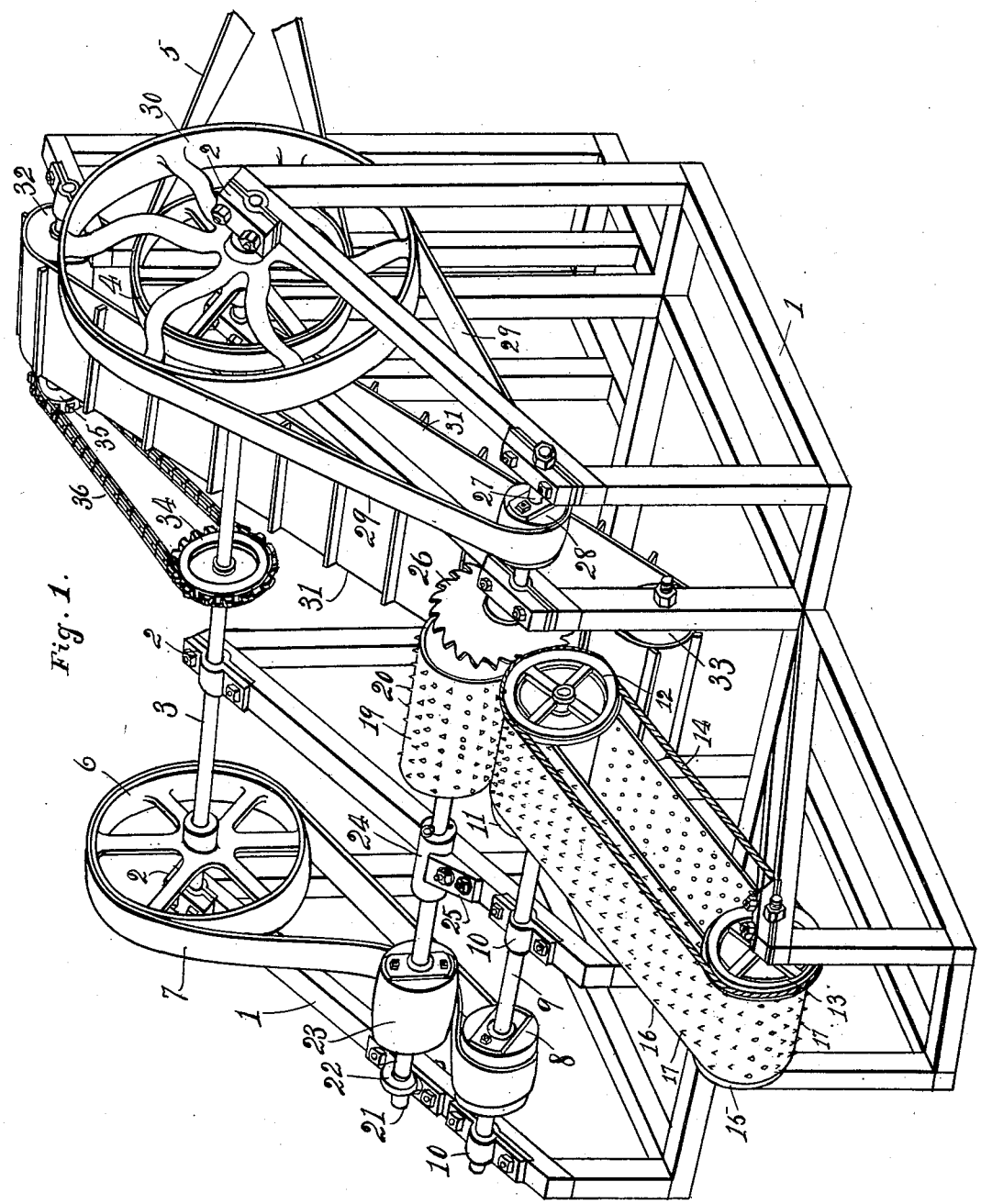

No. 706,145. Patented Aug. 5, 1902.
J. ALBRIGHT.
BEET TOPPING MACHINE.
(Application filed Sept. 26, 1901.)

(No Model.) 2 Sheets—Sheet 1.

WITNESSES: INVENTOR.
K. Lockwood Nevins. Joseph Albright
Cecelia Downing. BY Francis M. Wright
ATTORNEY.

No. 706,145. Patented Aug. 5, 1902.
J. ALBRIGHT.
BEET TOPPING MACHINE.
(Application filed Sept. 26, 1901.)
(No Model.) 2 Sheets—Sheet 2.
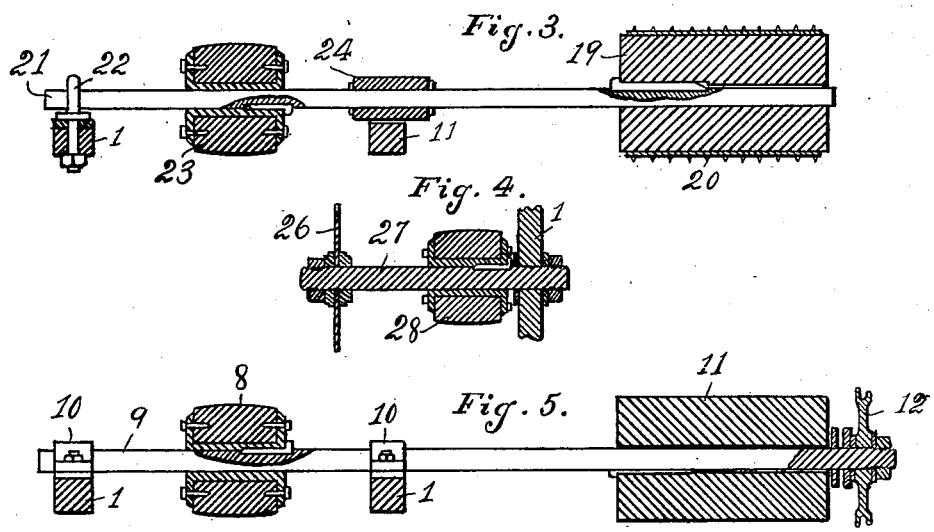
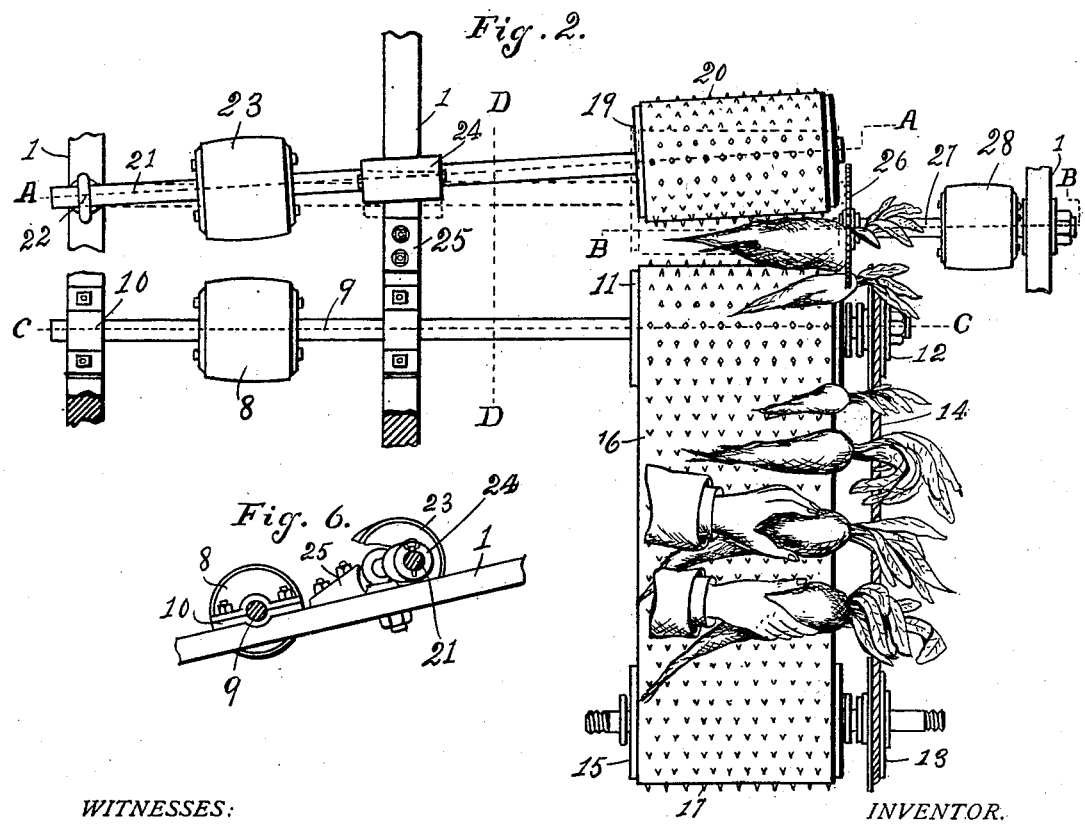
WITNESSES: INVENTOR.
Joseph Albright
BY
ATTORNEY.

UNITED STATES PATENT OFFICE.

JOSEPH ALBRIGHT, OF WATSONVILLE, CALIFORNIA.

BEET-TOPPING MACHINE.

SPECIFICATION forming part of Letters Patent No. 706,145, dated August 5, 1902.

Application filed September 26, 1901. Serial No. 76,595. (No model.)

*To all whom it may concern:*

Be it known that I, JOSEPH ALBRIGHT, a citizen of the United States, residing at Watsonville, in the county of Santa Cruz and State of California, have invented certain new and useful Improvements in Beet-Topping Machines, of which the following is a specification.

My invention relates to a beet-topping machine, the object of my invention being to provide a machine which can be moved about on the field in a wagon and by means of which the tops of beets may be cut off expeditiously and conveniently and the beets collected in a suitable receptacle.

My invention therefore resides in the novel construction, combination, and arrangement of parts for the above ends hereinafter fully specified, and particularly pointed out in the claim.

In the accompanying drawings, Figure 1 is a perspective view of the machine. Fig. 2 is a plan view of the carrier, showing the beets being topped thereby. Fig. 3 is a section on the line A A of Fig. 2. Fig. 4 is a section on the line B B of Fig. 2. Fig. 5 is a section on the line C C of Fig. 2, and Fig. 6 is a section on the line D D of Fig. 2.

Referring to the drawings, 1 represents a suitable frame upon which is mounted in bearings 2 a shaft 3, driven by a pulley 4 thereon and a belt 5 from any suitable source of power. Upon said shaft 3 is also mounted a pulley 6, around which travels a belt 7, which runs around a roller 8 on a shaft 9, mounted in fixed bearings 10 on the frame 1. Said shaft 9 drives a roller 11 and also by means of grooved pulleys 12 13 and a band 14 communicates motion to an idle roller 15. By means of said rollers 11 15 there is thus caused to travel a broad carrier 16, of leather or other suitable material, furnished with outwardly-pointing spikes 17. Upon said carrier 16 the beets are placed so that the upper ends of the beets proper or their junctions with the tops extend just beyond the edge of the carrier. The beets when thus placed in position on the carrier are held in place by means of the spikes 17, the tops resting on the band 14, and the beets are thus carried forward to the upper end of the carrier and pass between said carrier and a roller 19, also furnished with spikes 20.

The roller 19 is mounted upon a shaft 21, having a bearing 22 at one end only of the shaft, so that said shaft can vibrate through a small arc about said bearing. Said shaft 21 carries a roller 23, under which passes the belt 7, thereby rotating said roller in the opposite direction to the roller 8. Thereby also the roller 19 and the carrier 16 move in opposite directions. A roller 24, mounted loosely on the shaft 21, engages an abutment 25 upon the frame and supports the roller 19, said roller 24, however, being permitted to move upward on the frame or away from the abutment 25 when a beet is carried between the roller and the carrier and to allow said beet to pass through.

When the beets are carried into a position between the roller and the carrier with their tops extending over the edge of the carrier in the manner already described, said tops are cut off by means of a circular saw 26, carried upon a shaft 27, mounted in suitable bearings in the frame and rotated by means of a roller 28, belt 29, and pulley 30 upon the shaft 3. The beets passed between the carrier 16 and roller 19 fall upon a draper 31, traveling around rollers 32 33, the upper one of which, 32, is driven by means of sprocket-wheels 34 35 and a sprocket-chain 36 from the shaft 3. The beets may thus be carried by said draper to any suitable receptacle.

I do not restrict the application of my invention to removing of the tops of beets, as the same may be applied to top turnips or other similar vegetables, and I do not restrict myself to the precise construction herein claimed, as the same may be varied in different ways without departing from the spirit of my invention.

I claim—

In a beet-topping machine, the combination of an endless carrier running around horizontal shafts at its ends, and having suitable spikes to hold the beet in a fixed position on the upper surface thereof, a roller rolling opposite to the end of the carrier and mounted on a movable horizontal shaft substantially parallel to the horizontal shaft at the delivery end of the carrier, the opposite or nearest rolling-surfaces of the roller and carrier being vertical, and a circular saw mounted on a shaft substantially parallel with said last-named shaft, substantially as described.

In witness whereof I have hereunto set my hand in the presence of two subscribing witnesses.

JOSEPH ALBRIGHT.

Witnesses:
HUBERT C. WYCKOFF,
SAMUEL C. HERD.